United States Patent
Shin et al.

(10) Patent No.: US 9,711,989 B2
(45) Date of Patent: Jul. 18, 2017

(54) POWER CONSUMPTION CONTROL APPARATUS AND POWER CONSUMPTION CONTROL METHOD

(71) Applicant: SAMSUNG ELECTRONICS CO., LTD., Suwon-si, Gyeonggi-do (KR)

(72) Inventors: Jong Hyun Shin, Suwon-si (KR); Young Jin Park, Bucheon-si (KR); Sung Mok Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 909 days.

(21) Appl. No.: 13/711,326

(22) Filed: Dec. 11, 2012

(65) Prior Publication Data

US 2013/0147421 A1  Jun. 13, 2013

(30) Foreign Application Priority Data

Dec. 12, 2011  (KR) .......................... 10-2011-0132787

(51) Int. Cl.
- *H02J 7/00* (2006.01)
- *H02J 3/14* (2006.01)
- *H02J 7/35* (2006.01)

(52) U.S. Cl.
CPC ............... *H02J 7/007* (2013.01); *H02J 3/14* (2013.01); *H02J 7/35* (2013.01); *H02J 2003/146* (2013.01); *Y02B 70/3225* (2013.01); *Y02E 10/766* (2013.01); *Y04S 20/222* (2013.01); *Y04S 20/224* (2013.01)

(58) Field of Classification Search
USPC ......................................................... 320/101
See application file for complete search history.

(56) References Cited

U.S. PATENT DOCUMENTS

| 2010/0306027 A1* | 12/2010 | Haugh | G06Q 10/04 705/7.36 |
| 2011/0112703 A1* | 5/2011 | Lundberg | G06Q 10/00 700/297 |

* cited by examiner

*Primary Examiner* — Robert Grant
(74) *Attorney, Agent, or Firm* — Staas & Halsey LLP

(57) ABSTRACT

A power consumption control apparatus and method, the power consumption control method including calculating a charging cost, which represents a cost of power in a case of charging power, and a discharging cost, which represents a cost of power in a case of discharging power, of a power storage unit where the charging and discharging of power is performed, comparing the charging cost with the discharging cost of the power storage unit, controlling a power conversion unit to perform a discharging mode of performing one of the discharging of power and a reselling of power if the discharging cost is lower than the charging cost, and controlling the power conversion unit to perform a charging mode of charging the power storage unit with at least one of a new renewable power and a grid power if the charging cost is equal to or lower than the discharging cost.

19 Claims, 4 Drawing Sheets

POWER CONSUMPTION CONTROL APPARATUS AND POWER CONSUMPTION CONTROL METHOD

CROSS-REFERENCE TO RELATED APPLICATIONS

This application claims the priority benefit of Korean Patent Application No. 10-2011-0132787, filed on Dec. 12, 2011 in the Korean Intellectual Property Office, the disclosure of which is incorporated herein by reference.

BACKGROUND

1. Field

Example embodiments of the following disclosure relate to a power consumption control apparatus and a power consumption control method, and more particularly, a power consumption control apparatus and a power consumption control method of a power consumption subject, which consumes power, provided with a power storage unit therein.

2. Description of the Related Art

Generally, with respect to a power consumption subject, which consumes power, provided with a power storage unit therein, the power storage unit is only used to store surplus power. For example, a power control subject may be a subject, such as a household or a business, which consumes electricity and may provide a payment for the consumed electricity to a power utility company, and the like. In addition, with respect to charging the power storage unit or discharging the power stored in the power storage unit, the charging/discharging of power is performed without considering the charging price or the discharging price, and thus, a loss of unnecessary price is present.

Therefore, there is a need for improved power control with respect to a power consumption subject.

SUMMARY

Therefore, it is an aspect of the present disclosure to provide a power consumption control apparatus and a power consumption control method capable of charging and discharging in a way to reduce power price depending on the type of power consumption of a power consumption subject.

Additional aspects of the disclosure will be set forth in part in the description which follows and, in part, will be obvious from the description, or may be learned by practice of the disclosure.

In accordance with one aspect of the present disclosure, a power consumption control method is as follows. A charging cost, which represents a cost of power in a case of charging power, and a discharging cost, which represents a cost of power in a case of discharging power, of a power storage unit where the charging and discharging of power are performed may be calculated. The charging cost may be compared with the discharging cost of the power storage unit. A power conversion unit may be controlled to perform a discharging mode of performing one of the discharging of power and a reselling of power if the discharging cost is lower than the charging cost. The power conversion unit may be controlled to perform a charging mode of charging the power storage unit with at least one of a new renewable power and a grid power if the charging cost is equal to or lower than the discharging cost.

The power consumption control method may further include calculating a target amount of selling power. The reselling of power may be performed if failed to sell the power as much as the target amount of selling power.

The power consumption control method may further include calculating a target amount of charging power. The power storage unit may be determined to be needed with charging if the target amount of charging power is larger than 0.

The power consumption control method may further include calculating an expected amount of power generation of a new renewable energy source per unit time. The power storage unit may be charged with the new renewable power and the grid power if the target amount of charging power is larger than 0 and larger than the expected amount of power generation.

The power storage unit may be charged with the new renewable power if the target amount of charging power is larger than 0, and at the same time, is equal to or smaller than the expected amount of power generation.

In accordance with another aspect of the present disclosure, a power consumption control method is as follows. A charging cost, which represents a cost of power in a case of charging power, and a discharging cost, which represents a cost of power in a case of discharging power, of a power storage unit where the charging and discharging of power is performed may be calculated. The charging cost may be compared with the discharging cost of the power storage unit. A power conversion unit may be controlled to perform a discharging mode if the discharging cost is lower than the charging cost. The power conversion unit may be controlled to perform a charging mode if the charging cost is equal to or lower than the discharging cost.

The power conversion unit may be controlled to perform the discharging mode, in which one of a discharging of power or a reselling of power is performed, if the discharging cost is lower than the charging cost. The power conversion unit may be controlled to perform the charging mode, in which the power storage unit is charged with at least one of a new renewable power and a grid power, if the charging cost is equal to or lower than the discharging cost.

In accordance with another aspect of the present disclosure, a power consumption control apparatus may include a power storage unit, a power conversion unit, and a control unit. The power storage unit allows a charging of power and a discharging of power to be performed thereat. The power conversion unit may be configured to perform the charging and discharging of power of the power storage unit. The control unit may be configured to calculate a target amount of selling power and a target amount of charging power, calculate a charging cost of power in a case of charging power and a discharging cost of power in a case of discharging power of the power storage unit, compare the discharging cost with the charging cost of the power storage unit, control the power conversion unit to perform a discharging mode of performing one of the discharging of power and a reselling of power if the discharging cost is lower than the charging cost, and control the power conversion unit to perform a charging mode to charge the power storage unit with at least one of a new renewable power and a grid power if the charging cost is equal to or lower than the discharging cost, thereby reducing a cost of power of the power consumption control apparatus.

The control unit may include a communication unit, a storage unit, an operation unit, and a command generating unit. The communication unit may be configured to provide and collect information in communication with the power conversion unit, the power storage unit, a load, a new renewable energy source configured to generate the new renewable power, and a power utility company configured to generate the grid power. The storage unit may be configured to store the collected information. The operation unit may be configured to operate the collected information. The command generating unit may be configured to generate a control command for controlling power consumption, based on an operation of the operation unit.

The power consumption control apparatus may be provided at a power consumption subject such that a supply/demand and a consumption of power are controlled at the power consumption subject.

In accordance with another aspect of the present disclosure, a power consumption control apparatus may include a power storage unit, a power conversion unit, and a control unit. The power storage unit allows a charging of power and a discharging of power to be performed thereat. The power conversion unit may be configured to perform the charging and discharging of power of the power storage unit. The control unit may be configured to calculate a charging cost of power in a case of charging power of the power storage unit and a discharging cost of power in a case of discharging power of the power storage unit, compare the discharging cost with the charging cost, control the power conversion unit to perform a discharging mode if the discharging cost is lower than the charging cost, and control the power conversion unit to perform a charging mode if the charging cost is equal to or lower than the discharging cost, thereby reducing a cost of power of the power consumption control apparatus.

The control unit may include a communication unit, a storage unit, an operation unit and a command generating unit. The communication unit may be configured to provide and collect information in communication with the power conversion unit, the power storage unit, a load, a new renewable energy source configured to generate a new renewable power, and a power utility company configured to generate a grid power. The storage unit may be configured to store the collected information. The operation unit may be configured to operate the collected information. The command generating unit may be configured to generate a control command for controlling a power consumption, based on an operation of the operation unit.

The power consumption control apparatus may be provided at a power consumption subject such that a supply/demand and a consumption of power are controlled at the power consumption subject.

In accordance with another aspect of the present disclosure, a method for controlling power may include: calculating a charging cost of charging power and a discharging cost of discharging power; comparing the calculated charging cost with the calculated discharging cost; determining whether to perform a charging mode or a discharging mode with respect to a power storage unit, based on the comparing.

The charging mode may be performed with respect to the power storage unit when the calculated charging cost is equal to or lower than the calculated discharging cost.

The discharging mode may be performed with respect to the power storage unit when the calculated discharging cost is lower than the calculated charging cost.

The discharging mode may include one of performing discharging of the power stored in the power storage unit and reselling of at least a portion of the power stored in the power storage unit.

A determination of whether to perform the discharging of the power or the reselling of the power may be based upon at least whether or not resale of power is possible at a current point of time.

As described above, the power consumption control apparatus and method, by optimally controlling the charging and discharging to generate the minimum cost of power according to the type of power consumption of the power consumption subject, can promote the benefits of the power consumption subject at the power consumption subject while reducing the peak demand at the power supply subject.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
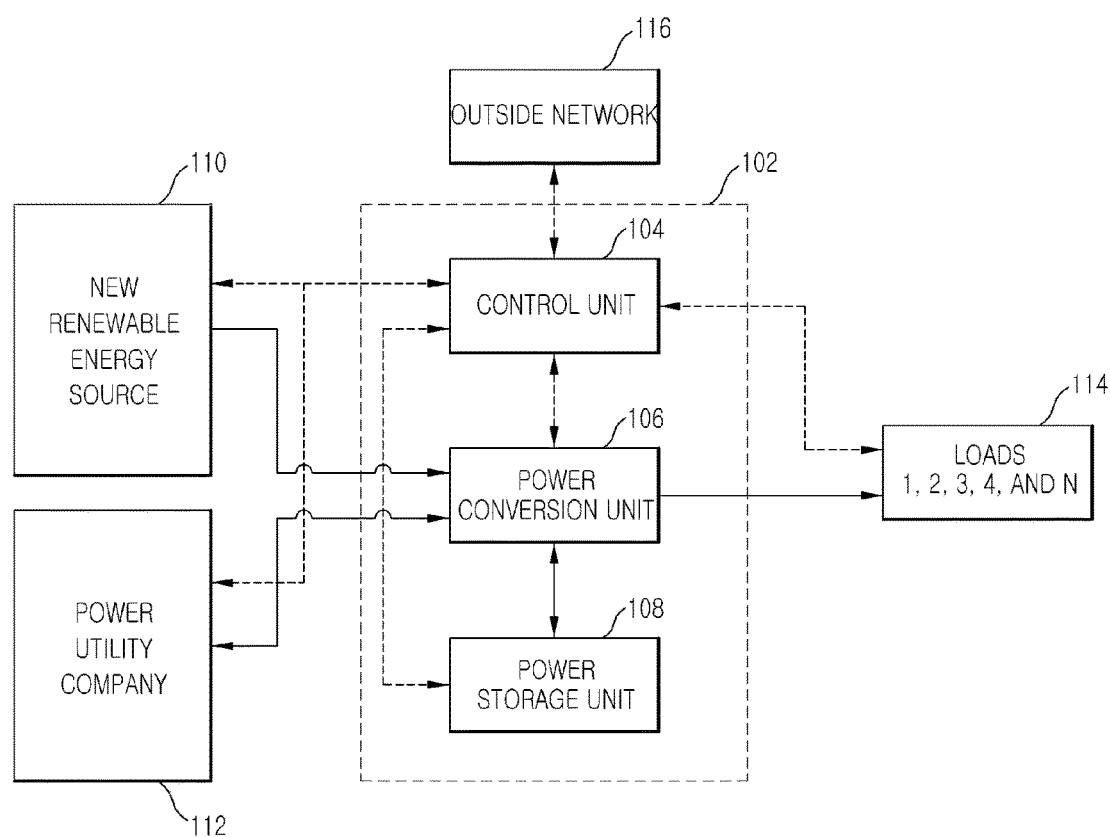
FIG. 1 is a drawing showing a structure of a power consumption control apparatus in accordance with an example embodiment of the present disclosure.

Reference will now be made in detail to the embodiments of the present disclosure, examples of which are illustrated in the accompanying drawings, wherein like reference numerals refer to like elements throughout.

FIG. 1 is a drawing showing a structure of a power consumption control apparatus 102 in accordance with an example embodiment of the present disclosure. As shown on FIG. 1, a power consumption control apparatus 102 in accordance with an example embodiment of the present disclosure includes a control unit 104, a power conversion unit 106, and a power storage unit 108. The power consumption control apparatus 102 is provided at a power consumption subject that consumes electricity and provides a payment for the consumed electricity, such as, a household or a business. Further, the power consumption control apparatus 102 is configured to control the supply/demand and the consumption of the power to help the subject of the power consumption to use the power efficiently.

The control unit 104 of the power consumption control apparatus 102 controls the entire operation of the power consumption control apparatus 102, so that the power consumption subject may use power efficiently. For the above, the control unit 104 exchanges information with the power conversion unit 106, the power storage unit 108, a load 114, an outside new renewable energy source 110, an outside power utility company 112, that is, a subject of power supply, and an outside network 116 by electrically communicating with each other. The control unit 104, through the outside network 116, receives weather information, and uses the weather information to forecast the amount of the new renewable power generated at the new renewable energy source 110.

For example, the new renewable energy source may be solar power derived from photovoltaic cells, and the like. As such, the information collected by the control unit 104 to generate solar power includes the amount of solar radiation, the distribution of clouds, moving directions of clouds, temperature, and calibration factor. In addition, the control unit 104 receives the information such as the supply/demand status of power and the price of electricity by communicating with the power utility company 112. In addition, the control unit 104 analyzes the power usage pattern at the load 114, and forecasts the amount of power consumption at the load 114 by communicating with the load 114. In addition, the control unit 104 secures the charging status information of the power storage unit 108 through the communication with the power storage unit 108. As shown on FIG. 1, the control unit 104 may be provided at an inside the power consumption control apparatus 102, or may be connected to the power consumption control apparatus 102 through the network while provided in a form of a server at an outside.

The power conversion unit 106 of the power consumption control apparatus 102 may perform the charging and the discharging, and the conversion of the power of the power storage unit 108. That is, the power conversion unit 106 may deliver the new renewable power, which is supplied from the new renewable energy source 110, or the grid power, which is supplied from the power utility company 112, to the power storage unit 108, so that the new renewable power or the grid power is stored at the power storage unit 108. Further, the power storage unit 108 may supply the supplied power to the load 114, such that the load 114 consumes the power needed. In addition, the power conversion unit 106 changes the flow, i.e., the direction, of the power, and converts the electrical features, such as, a frequency and a phase, of the power. For example, DC power may be converted to single-phase AC power, or to polyphase AC power.

The power storage unit 108 of the power consumption control apparatus 102 may store the power while being charged with the power supplied from an outside. Further, the power storage unit 108 may consume power by discharging the power stored. For example, the power storage unit 108 stores (charges) the new renewable power, which is supplied from the new renewable energy source 110, or the grid power, which is supplied from the power utility company 112, so that the new renewable power or the grid power is stored at the power storage unit 108. Further, the power storage unit 108 provides (discharges) the stored power to the load 114 or to the power utility company 112. The supply of the power to the power utility company 112 from the power storage unit 108 represents the resale of the power, in other words, the reselling of the power which was previously purchased.

The new renewable energy source 110 refers to the new energy and the renewable energy. The new energy may include fuel cells, coal liquefaction/gasification, and hydrogen energy.

The fuel cell, through the chemical reaction of hydrogen and oxygen in air, directly converts the chemical energy, which is generated by the oxidation of the hydrogen, into electric energy.

The coal liquefaction/gasification is a technology to attain energy by liquefying or gasifying coals, and the coal liquefaction is a technology to change coals, which are solid fuel, to liquid fuel, such as, gasoline and diesel fuel. This technology as such may include a direct liquefaction method configured to change coals, which is in a high-temperature, high-pressure state, by using solvent, and a indirect liquefaction method configured to change coals to liquid fuel on a catalyst after the gasification of coals. The gasification of coals is a technology configured to generate power by driving a gas turbine or a steam turbine by using synthetic gas, which is produced by having low-quality fuels, such as, coals and intermediate quality residue oil, imperfectly combusted and gasified along with steam using limited oxygen in a gasification apparatus at a high-temperature and high-pressure state, which is provided with carbon monoxide and hydrogen as key elements therein, and is passed through a purification process.

A hydrogen gas technology is the technology configured to separately produce the hydrogen, which is current in the form of compound matter such as water, organic matter, and fossil fuels, for use as an energy source.

The renewable energy may include a solar thermal power generation and a solar photovoltaic power generation, biomass energy, a wind power generation, a small hydropower generation, geothermal energy, ocean energy, and waste energy.

The solar thermal power generation is a system configured to create high-temperature air and steam by gathering solar heat to rotate a turbine for a generation of power. With respect to a heat collecting apparatus configured to change light into heat, the water being supplied is heated to be vaporized, and the vaporized water is sent to a turbine through a heat storage tank. The principle of the power generation after the turbine may be the same as the principle of a conventional thermal power generation.

The photovoltaic power generation is one of the power generation technologies by solar energy, and by using a photo-electric conversion apparatus which is called a solar battery, the light energy of the sun is directly changed into electric energy to obtain energy. The photovoltaic power generation is configured to use light partially, and thus, the use of such may be possible even on cloudy days.

The biomass is a method to produce energy by using trees and crops, vegetables and agricultural wastes, livestock wastes, and food wastes. For example, the methane or other gases, which are generated from the excrements of livestock or the wastes at dump yards are decomposed and burned to provide heat or generate power.

A wind power generating apparatus is an apparatus configured to change or convert the energy of winds into electric energy. By rotating the wings of the wind power generating apparatus, a rotating force is generated, and by using the rotating force, electricity is produced.

The small hydropower generation is a method of a power generation, which is configured to create kinetic energy from smaller amounts of water using the potential energy of a stream of water, e.g., a river, and the kinetic energy is changed into electric energy, which is mostly less than 20 MW, to obtain electricity. The difference of the small hydropower generation and a conventional hydraulic power generation is that the conventional hydraulic power generation obtains energy by the difference of the hydraulic heads of a multi-purpose dam, whereas, the small hydropower generation uses the potential energy from the flow of water.

The geothermal energy is a form of energy that is used for a power generation to rotate a steam turbine by using the steam that is generated by injecting water to the geothermal energy. In an area where there is no volcano, the geothermal energy at about 100° C. may be obtained from an underground depth of about 3,000 meters, and depending on an area, the temperature of the geothermal energy may be higher.

The ocean energy is energy generated by high seas, tides, currents, ocean currents, and the difference in the temperature of sea waters. A wave-power generation, a tidal power generation, and an ocean thermal energy conversion may be used.

The waste energy is a technology configured to pyrolyze the waste having high energy content among the combustible wastes generated from a business or a household, as to generate solid fuel, liquid fuel, gas fuel, and waste heat, and is configured to recycle the solid fuel, the liquid fuel, the gas fuel, and the waste heat to be used as energy needed for industrial activities.

The power utility company 112 is defined as a business that sells the power that is supplied from several power generation facilities. The power utility company 112 supplies power by setting the price of electricity, which is consumed during the time period when the power consumption is small, at a lower price as compared to the price of electricity, which is consumed during the time period when the power consumption is large. Further, the power utility company also sets the price of electricity, which is consumed during the seasons when the power consumption is small, at a lower price as compared to the price of electricity, which is consumed during the seasons when the power consumption is large. As the above, by flexibly setting the price of electricity in connection with the power consumption pattern of the consumer or the season of the year, the balance in the supply and the consumption of the power may be promoted.

In addition, the power utility company 112, on the basis of the amount of power generation, the usage information of the power by time and season in the past, and weather information, may forecast the amount of the power consumption and set the price of electricity. At this time, the pricing level corresponding to the price of electricity may be set. In addition, the power utility company 112 collects and stores the amount of the power consumption that is being consumed at the power consumption subject by each pricing level. Further, the power utility company 112 may calculate the price of electricity in accordance with the amount of the power consumption at each subject of the power consumption at each pricing level, on a monthly basis, so that the calculated price of electricity may be invoiced on a monthly basis. In addition, the power utility company 112, by comparing the price of electricity that is periodically calculated with a predetermined price of electricity that is allotted on a monthly basis, determines the limitation on the power supply. Further, if the calculated price of electricity exceeds the price of electricity allotted on a monthly basis, the power utility company 112 transmits information on the excess of the price of electricity allotted on a monthly basis to the power consumption control apparatus 102 provided at the corresponding subject of the power consumption, so that an event related to the excess in the price of electricity allotted on a monthly basis may take place through the power consumption control apparatus 102.

In addition, the power utility company 112 may store a threshold amount of power by each power consumption subject, and may determine the limitation of the power supply by comparing the amount of power consumption by each power consumption subject with the threshold amount of power. In addition, as the above, the power utility company 112, on the basis of the threshold amount of power or the price of electricity allotted on a monthly basis, manages the supply/demand of power of the subject of power consumption. Here, the threshold amount of power configured to limit the supply of power by each subject of power consumption may be randomly set by the power utility company 112 or is set by the agreement with the power utility company 112 of each subject of power consumption. The price of electricity allotted on a monthly basis at each subject of power consumption is set according to the agreement with the power utility company 112 of each consumer. In addition, the power utility company 112 stores and manages the information on the status of power consumption according to the occurrence of a threshold power exceed-related event by each subject of power consumption and according to the occurrence of a monthly allotment exceed-related event by each subject of power consumption on a monthly basis. The power consumption control apparatus 102, as the above, is connected to the control unit 104 each provided at a plurality of subjects of power consumption through the network, and transmits/receives the information needed for the management of the supply/demand of power. The network may be of a wire network, a wireless network, or a wire/wireless network combined.

Referring to FIG. 1, with reference to the direction of the power being delivered while having the power conversion unit 106 as a center of the delivery, the power supply is taken place in a single direction from the new renewable energy source 110 to the power conversion unit 106 (indicated by an arrow), and the power supply in a single direction takes place from the power conversion unit 106 to the load 114 (indicated by an arrow). On the contrary to the above, a two-way supply of power is taken place between the power conversion unit 106 and the power storage unit 108. The two-way supply of power between the power conversion unit 106 and the power storage unit 108 is achieved by the charge/discharge of the power storage unit 108. In addition, a two-way supply of power takes place between the power conversion unit 106 and the power utility company 112. In the two-way supply of power between the power conversion unit 106 and the power utility company 112, one direction takes place when the power is purchased and supplied from the power utility company 112, and another direction takes place when the power stored at the power storage unit 108 is resold to the power utility company 112.

Figure 2:
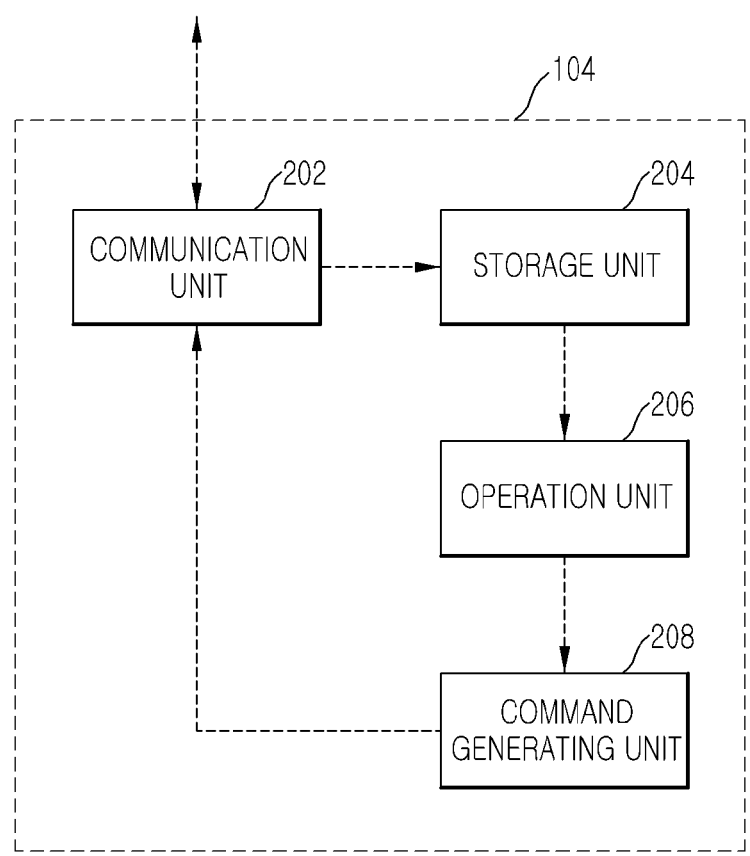
FIG. 2 is a drawing showing a structure of a control unit of the power consumption control apparatus shown on FIG. 1.

FIG. 2 is a drawing showing a structure of a control unit 104 of the power consumption control apparatus 102 shown on FIG. 1. As shown on FIG. 2, the control unit 104 includes a communication unit 202, a storage unit 204, an operation unit 206, and a command generating unit 208. The communication unit 202 electrically communicates with other apparatuses, which may include the power conversion unit 106, the power storage unit 108, the load 114, the outside new renewable energy source 110, the power utility company 112, and the outside network 116, in providing and collecting information. Depending on embodiments, the data collected through the communication is stored at the storage unit 204, and through the operation unit 206, the operation needed is performed and is provided to the command generating unit 208. The command generating unit 208 generates a control command configured to optimally control power consumption, and delivers the control command generated to other apparatuses, which may include the power conversion unit 106, the power storage unit 108, the load 114, the outside new renewable energy source 110, the power utility company 112, and the outside network 116.

Figure 3:
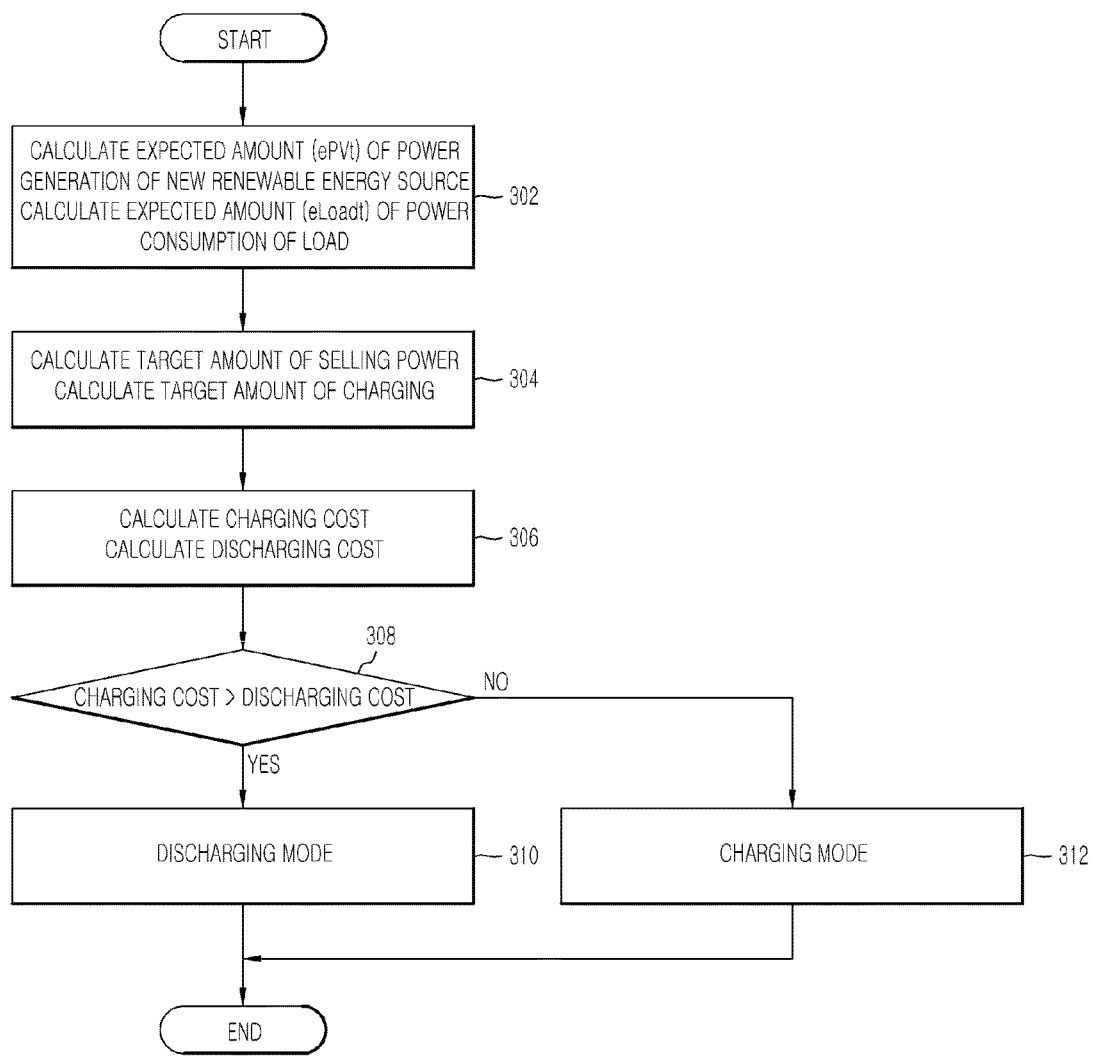
FIG. 3 is a drawing showing a power consumption control method in accordance with an example embodiment of the present disclosure.

FIG. 3 is a drawing showing a power consumption control method in accordance with an example embodiment of the present disclosure. The power consumption control method illustrated on FIG. 3 may be performed based on the configuration shown on FIGS. 1 and 2. The power consumption control method in accordance with this example embodiment of the present disclosure shown in FIG. 3 is a power consumption control method capable of performing an effective power management in a way to select power for charging the power storage unit 106 and resell the charged power. As such, the control unit 104 may perform the power consumption control in consideration of the expected amount ePV of power generation of the new renewable energy source 110, the amount and price of power being supplied from the power utility company 112, and the expected amount eLoad of power consumption required at the load 114.

Referring to FIG. 3, the control unit 104 calculates an expected amount ePVt of power generated from the new renewable energy source 110 per unit time, and calculates an expected amount eLoadt of power consumption required at the load 114 per unit time in operation 302.

In the case of a solar thermal energy generation, the expected amount ePVt of power generation of the new renewable energy source 110 per unit time is calculated using the following formula 1, shown below.

$$PV_t \propto \frac{R_t}{PV_{temp}} Coeff_t \qquad \text{[Formula 1]}$$

From the above formula 1, Rt refers to insolation, and PVtemp refers to the temperature of a light collecting panel of a solar thermal energy generation facility. Coefft refers to a coefficient for correction. The amount of power generation of the solar thermal energy generation facility is in proportion to the insolation and in inverse proportion to the temperature of the light collecting panel.

In addition, the control unit 104 calculates the expected amount eLoadt of power consumption required at the load 114 per unit time by using the following formula 2, shown below.

$$eLoad_t = \sum_{n=1}^{m} Pw_n Pt_n \qquad \text{[Formula 2]}$$

From the formula 2, Pwn is the power consumption of one of a plurality of loads, Ptn is the possibility to operate the one of the plurality of loads at a predetermined time t, and n is a number corresponding to a load of the plurality of loads.

The control unit 104 calculates a target amount of selling power and a target amount of charging power in operation 304. With reference to the target amount of selling power, the power consumption subject is obliged to sell power to the power utility company 112, as much as is designated in a preexisting agreement with the power utility company 112 (in general, excess amount of power is sold). The target amount of selling power required to meet the amount of power agreed for sale is calculated, and the calculated target amount of selling power is used as a reference when determining whether to charge or discharge (sell) the power storage unit 108. In order to calculate the target amount of selling power Pwt, the expected amount ePVt of power generation per unit time and the expected amount eLoadt of power consumption per unit time, which are calculated above, are used. The target amount of selling power Pwt is expressed in the following formula 3, shown below.

$$Pw_t(SOC_t - |ePV_t - eLoad_t|) \times \text{margin} \qquad \text{[Formula 3]}$$

From the formula 3, SOCt refers to a state of charge of a battery, ePVt refers to an expected amount of power generation per unit time, eLoadt refers to an expected amount of power consumption required at the load 114 per unit time, and margin is a value equal to or smaller than 1, which serves to place a margin at the target amount of selling power by having the calculated target amount of selling power be lower than a possible amount of selling power in reality.

In addition, the target amount of charging refers to the amount of power required to fully charge the power storage unit 108. Even if the power storage unit 108 has space available to be charged, the power storage unit 108 is not charged unconditionally. Accordingly, it is determined whether to charge the power storage unit 108 based on the amount of new renewable power being supplied from the new renewable energy source 110, that is, the amount of generation of the new renewable power. For example, if the new renewable power supplied from the new renewable energy source 110 is cheaper than the grid power supplied from the power utility company 112, the power consumption control apparatus 102 may charge the power storage unit 108 with the new renewable power being supplied from the new renewable energy source 110. However, even in a case that the power storage unit 108 is needed to be charged since the expected amount of power consumption required at the load 114 is large, if the supply of power from the new renewable energy source 110 is not enough to charge the power storage unit 108, the power storage unit 108 is charged with the grid power being supplied from the power utility company 112 despite the high price. In order to make a determination as such, the target amount of charging is calculated. In calculating the target amount Charget of charging, the expected amount ePVt of power generation per unit time and the expected amount eLoadt of power consumption per unit time, which are calculated above, are used. The target amount Charget of charging is expressed in the following formula 4, shown below.

$$\text{Charge}_t = (eLoad_t - ePV_t) \times \alpha, eLoad_t > ePV_t \qquad \text{[Formula 4]}$$

From the formula 4, eLoadt refers the expected amount of power consumption required at the load 114 per unit time, ePVt refers to the expected amount of power generation per unit time, and a refers to a coefficient in consideration of the loss in charging. For example, if the loss in charging is 10%, a is set to 1.1 so that the loss rate of 10% is compensated. The formula 4 applies when the expected amount eLoadt of power consumption per unit time is larger than the expected amount ePVt of power generation per unit time.

The control unit 104 calculates a charging cost and a discharging cost that serve as grounds to determine the charging or the discharging in terms of cost effectiveness in operation 306. The charging cost refers to a cost of power required for charging the power storage unit 108, and may vary depending on the price of the grid power being supplied through the power utility company 112. The discharging cost includes the cost of power discharged and the price of power resold. The price of power resold refers to a price expected when the power stored in the power storage unit 108 is resold to the power utility company 112. In general, the cost of power purchased from the power utility company 112 is different from the price of power resold to the power utility company 112, and in some cases, the price of power resold to the power utility company 112 may be higher than the cost of power purchased from the power utility company 112. However, the present disclosure is not limited thereto. Accordingly, if an excess of power is present in the power storage unit 108, the excess of power may be resold at a later time, and the power may be purchased at a lower cost for charging.

If the information needed for determining a charging mode or a discharging mode is collected, the control unit 104 compares the charging cost with the discharging cost based on the collected information, and according to the result of comparison, one of the charging mode and the discharging mode is selected in operation 308. If the discharging cost is lower than the charging cost (YES from 308), the discharging mode is beneficial to reduction in the cost, so the control unit 104 performs the discharging mode in operation 310. If the charging cost is equal to or lower than the discharging cost (NO from 308), the charging mode is beneficial to reduction in the cost, so the control unit 104 performs the charging mode in operation 312.

In the discharging mode, the power is resold to the power utility company 112, or is discharged to the load 114 for use at the load 114. In the charging mode, as related to charging the power storage unit 108, the power storage unit 108 is charged with one of the new renewable power being supplied from the new renewable energy source 110 and the grid power being supplied from the power utility company 112 in consideration of the target amount of charging power, the status of power generation of the new renewable energy source 110, and the status of power consumption of the load 114.

Figure 4:
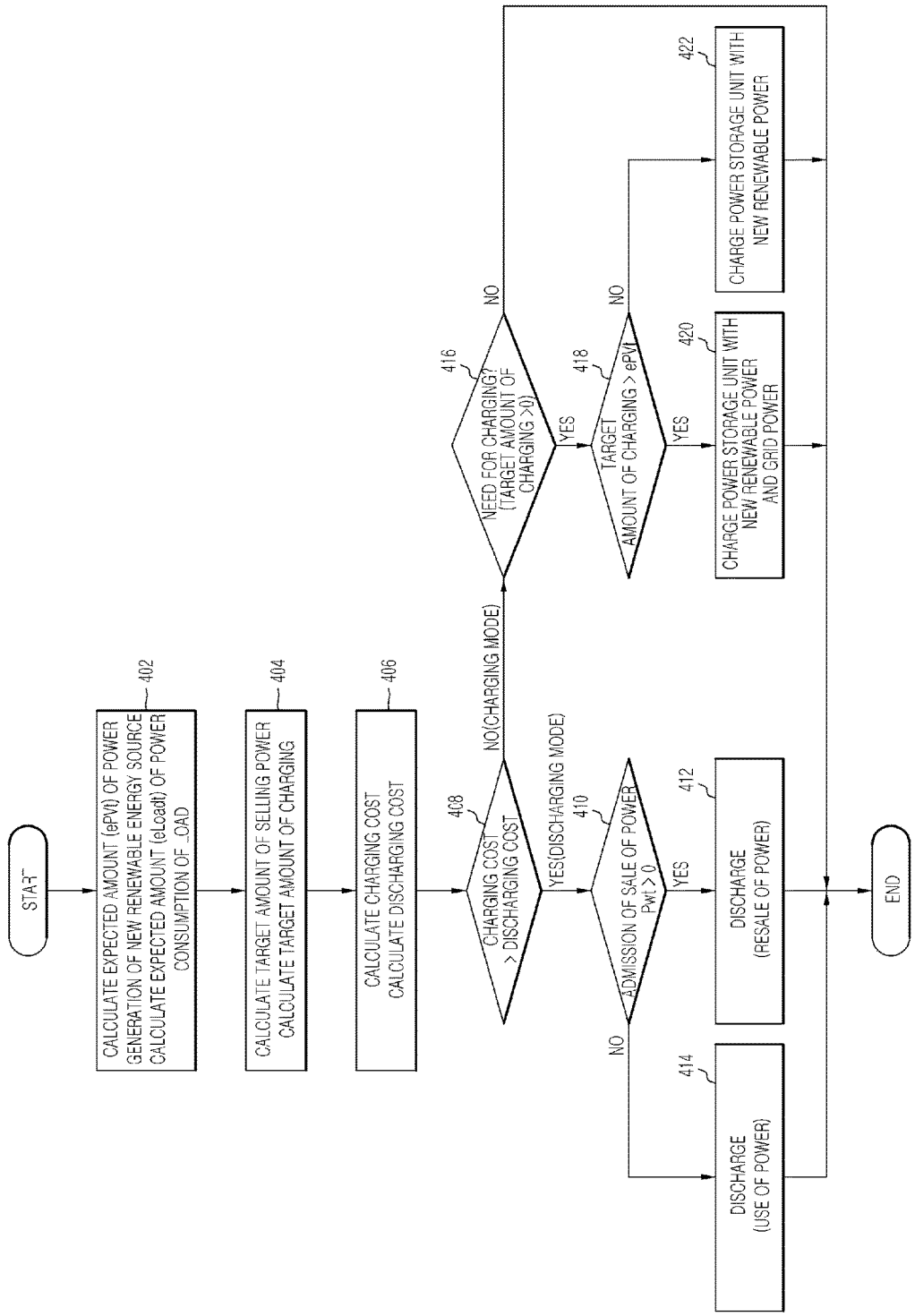
FIG. 4 is a drawing showing a power consumption control method in accordance with an example embodiment of the present disclosure.

FIG. 4 illustrates a flowchart showing a power consumption control method in accordance with another example embodiment of the present disclosure. The power consumption control method illustrated on FIG. 4 may be performed based on the configuration shown on FIGS. 1 and 2. The power consumption control method in accordance with this example embodiment of the present disclosure shown in FIG. 4 is a power consumption control method capable of performing an effective power management in a way to resell power and select power for charging a battery. As such, the control unit 104 performs the power consumption control in consideration of the expected amount ePV of power generation of the new renewable energy source 110, the amount and price of power supplied from the power utility company 112, and the expected amount eLoad of power consumption required at the load 114.

Referring to FIG. 4, the control unit 104 calculates an expected amount ePVt of power generation of the new renewable energy source 110 per unit time, and calculates an expected amount eLoadt of power consumption required at the load 114 per unit time in operation 402.

For the above, with reference to a solar thermal energy generation, the control unit 104 calculates the expected amount ePVt of power generation of the new renewable energy source 110 per unit time by using the following formula 5, shown below.

$$PV_t \propto \frac{R_t}{PV_{Temp}} Coeff_t \quad \text{[Formula 5]}$$

From the above formula 5, Rt refers to insolation, PVtemp refers to the temperature of a light collecting panel of a solar thermal energy generation facility. Coefft refers to a coefficient for correction. As shown in formula 5, the amount of power generation of the solar thermal energy generation facility is in proportion to the insolation and in inverse proportion to the temperature of the light collecting panel.

In addition, the control unit 104 calculates the expected amount eLoadt of power consumption required at the load 114 per unit time by using the following formula 6, shown below.

$$eLoad_t = \sum_{n=1}^{m} Pw_n Pt_n \quad \text{[Formula 6]}$$

From the formula 6, Pwn is the power consumption of one of a plurality of loads, Ptn is the possibility to operate one of the plurality of loads at a predetermined time t, and n refers to a number corresponding to a load of the plurality of loads.

The control unit 104 calculates a target amount of selling and a target amount of charging in operation 404. With reference to the target amount of selling, the power consumption subject is obliged to sell power to the power utility company 112 in an amount that is as much as designated in an agreement with the power utility company 112 (in general, excess amount of power is sold). The target amount of selling power, required to meet the amount of power agreed for sale, is calculated, and the calculated target amount of selling power is used as grounds to determine whether to charge or discharge the power storage unit 108. The target amount of selling power Pwt is expressed in the following formula 7, shown below.

$$Pw_t(SOC_t - |ePV_t - eLoad_t|) \times \text{margin} \quad \text{[Formula 7]}$$

From the formula 7, SOCt refers to a state of charge of a battery, ePVt refers to the expected amount of power generation per unit time, eLoadt refers to the expected amount of power consumption required at the load 114 per unit time, and margin is a value equal to or smaller than 1, that serves to place a margin at the target amount of selling power by having the calculated target amount of selling power to be lower than a possible amount of selling power in reality.

In addition, the target amount of charging refers to the amount of power required to fully charge the power storage unit 108. Even if the power storage unit 108 has space available to be charged, the power storage unit 108 is not charged unconditionally. As such, it is determined whether to perform a charging in consideration of the amount of new renewable power supplied from the new renewable energy source 110, that is, the amount of generation of the new renewable power. If the new renewable power supplied from the new renewable energy source 110 is cheaper than the grid power supplied from the power utility company 112, the power consumption control apparatus 102 may charge the power storage unit 108 with the new renewable power being supplied from the new renewable energy source 110. However, even in a case in which the power storage unit 108 is needed to be charged since the expected amount of power consumption required at the load 114 is large, if the supply of power from the new renewable energy source 110 is not enough to charge the power storage unit 108, the power storage unit 108 is charged with the grid power being supplied from the power utility company 112 despite the high price. In order to make a determination as such, the target amount of charging may need to be calculated. The target amount Charget of charging is expressed in the following formula 8, shown below.

$$Charge_t = (eLoad_t - ePV_t) \times \alpha, eLoad_t > ePV_t \quad \text{[Formula 8]}$$

From the formula 8, eLoadt refers the expected amount of power consumption required at the load 114 per unit time, ePVt refers to the expected amount of power generation per unit time, and a refers to a coefficient in consideration of the loss in charging. For example, if the loss in charging is 10%, α is set to 1.1 so that the loss rate of 10% is compensated. The formula 8 applies when the expected amount eLoadt of power consumption per unit time is larger than the expected amount of power generation per unit time.

The control unit 104 may calculate a charging cost and a discharging cost that serve as grounds to determine the charging or the discharging in terms of cost effectiveness in operation 406. The charging cost may refer to a cost of power required for charging the power storage unit 108, and may vary depending on the price of the grid power being supplied through the power utility company 112. The discharging cost may include the cost of power discharged and the price of power resold. The price of power resold refers to a price expected when the power stored in the power storage unit 108 is resold to the power utility company 112. In general, the cost of power purchased from the power utility company 112 is different from the price of power resold to the power utility company 112, and in some cases, the price of power resold to the power utility company 112 may be higher than the cost of power purchased from the power utility company 112. Accordingly, if an excess of power is present in the power storage unit 108, the excess of power is resold at a later time, and the power is purchased at a lower cost for charging.

If the information needed for determining a charging mode or a discharging mode is collected, the control unit 104 compares the charging cost with the discharging cost based on the collected information, and according to the result of comparison, one of the charging mode and the discharging mode is selected in operation 408. If the discharging cost is lower than the charging cost (YES from 408), the discharging mode is beneficial to reduction in the cost, so the control unit 104 performs the discharging mode. If the charging cost is equal to or lower than the discharging cost (NO from 408), the charging mode is beneficial to reduction in the cost, so the control unit 104 performs the charging mode.

With respect to the discharging mode, the admission of sale of power of the power utility company 112 is checked in advance in operation 410. That is, in a case that a contract is made with the power utility company 112 on the resale of power, if a current state corresponds to a point of time when the resale of power is possible (YES from 410), the sale of power is determined as being admitted, and thus, power is resold to the power utility company 112 in operation 412. On the contrary, if a contract on the resale of power is not made, or if a current point of time is not possible for the resale of power even in a case that the contract is made (NO from 410), the power is discharged to the load 114 for use at the load 114 in operation 414. The conditions of determining the possibility of resale may include a condition that the target amount Pwt of selling power be larger than 0 as the sale of power is not achieved as much as promised on the contract. That is, if the power is not sold as much as a target amount of selling power, a resale of power may be attempted for meeting the target amount of selling power.

With respect to the charging mode to perform the charging on the power storage unit 108, it is determined, which one of the new renewable power being supplied from the new renewable energy source 110 and the grid power being supplied from the power utility company 112 is used to charge the power storage unit 108 in consideration of the status of power generation of the new renewable energy source 110 and the status of power consumption at the load 114.

With respect to the charging mode, first, the need for charging the power storage unit 108 is determined in operation 416. Depending on embodiments, the control unit 104 determines that the power storage unit 108 is needed to be charged if the target amount of charging is larger than 0. If the need for charging the power storage unit 108 is present (YES from 416), the target amount of charging is compared with the amount of new renewable power generation so as to determine which one of the new renewable power being supplied from the new renewable energy source 110 and the grid power being supplied from the power utility company 112 is suitable for charging the power storage unit in operation 418. The amount of new renewable power generation may refer to the amount of power being generated from the new renewable energy source 110. If the target amount of charging is larger than the amount of new renewable power generation (YES from 418), the new renewable power from the new renewable energy source 110 is not enough for meeting the target amount of charging required at the power storage unit 108. Accordingly, the control unit 104 selects, as well as the new renewable power, the grid power being supplied from the power utility company 112 as a power for charging. By use of the selected power, the power storage unit 108 is filled up to the target amount of charging in operation 420. In this case, the cost of power is increased as the power storage unit 108 is charged with the grid power being supplied from the power utility company 112, but the peak demand that may take place at the load 114 is prepared, so that a stable supply of power is ensured. On the contrary, if the target amount of charging is equal to or smaller than the amount of new renewable power generation (NO from 418), the new renewable power from the new renewable energy source 110 is enough for meeting the target amount of charging required at the power storage unit 108. Accordingly, the control unit 104 selects the new renewable power as a power for charging, and charges the power storage unit 108 only with the new renewable power in operation 422. In this case, the cost of power is significantly reduced since the power storage unit 108 is charged with the new renewable power that does not incur a cost or incur a small cost when compared to the grid power being supplied from the power utility company 112.

By returning to operation 416 of determining the need for charging, the control unit 104 determines that there is no need for charging the power storage unit 108 if the target amount of charging of the power storage unit 108 is equal to or smaller than 0.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the power consumption control apparatus may include at least one processor to execute at least one of the above-described units and methods.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A power consumption control method, comprising:
calculating a target amount of selling power;
calculating a charging cost representing a cost of power when charging power, and a discharging cost representing a cost of power when discharging power, of a power storage unit where the charging and discharging of power is performed;
comparing the calculated charging cost with the calculated discharging cost of the power storage unit;
controlling a power conversion unit to perform a discharging mode that performs one of the discharging of power and a reselling of power when the calculated discharging cost is lower than the calculated charging cost; and
controlling the power conversion unit to perform a charging mode of charging the power storage unit with at least one of a new renewable power and a grid power when the calculated charging cost is equal to or lower than the calculated discharging cost,
wherein the charging cost refers to the cost of power when charging the power storage unit,
wherein the discharging cost includes the cost of power when discharging the power and a price of power resold,
wherein the target amount of selling power is expressed in a following mathematical formula:

$$Pw_t(SOC_t - |ePV_t - eLoad_t|) \times margin$$

wherein the $SOC_t$ refers to a state of charge of a battery, the $ePV_t$ refers to an expected amount of power generation per unit time, $eLoad_t$ refers to an expected amount of power consumption required at a load per unit time, and the margin refers to a value equal to or smaller than 1 and is configured to put a margin at the target amount of selling power by having the calculated target amount of selling power be lower than a possible amount of selling power.

2. The power consumption control method of claim 1, wherein the reselling of power is performed when the price of the power resold is not as much as the target amount of selling power.

3. The power consumption control method of claim 1, further comprising calculating a target amount of charging power,
wherein the power storage unit is determined to need charging when the target amount of charging power is larger than 0.

4. The power consumption control method of claim 3, wherein the target amount of charging power is expressed in a following mathematical formula:

$$Charge_t = (eLoad_t - ePV_t) \times \alpha, eLoad_t > ePV_t$$

wherein the $\alpha$ refers to a coefficient in consideration of the loss in charging, and the mathematical formula applies when the expected amount of power consumption per unit time is larger than the expected amount of power generation per unit time.

5. The power consumption control method of claim 3, further comprising:
calculating an expected amount of power generation of a new renewable energy source per unit time,
wherein the power storage unit is charged with the new renewable power and the grid power when the target amount of charging power is larger than 0 and larger than the expected amount of power generation.

6. The power consumption control method of claim 5, wherein the power storage unit is charged with the new renewable power when the target amount of charging power is larger than 0, and at the same time, is equal to or smaller than the expected amount of power generation.

7. A power consumption control method comprising:
calculating a target amount of selling power;
calculating a charging cost representing a cost of power when charging power, and a discharging cost representing a cost of power when discharging power of a power storage unit where the charging of power and the discharging of power is performed;
comparing the calculated charging cost with the calculated discharging cost of the power storage unit;
controlling a power conversion unit to perform a discharging mode when the calculated discharging cost is lower than the calculated charging cost; and
controlling the power conversion unit to perform a charging mode when the calculated charging cost is equal to or lower than the calculated discharging cost,
wherein the charging cost refers to the cost of power required for charging the power storage unit, and
wherein the discharging cost includes the cost of power discharged and the price of power resold,
wherein the target amount of selling power is expressed in a following mathematical formula:

$$Pw_t(SOC_t - |ePV_t - eLoad_t|) \times margin, \text{ and}$$

wherein the $SOC_t$ refers to a state of charge of a battery, the $ePV_t$ refers to an expected amount of power generation per unit time, the $eLoad_t$ refers to an expected amount of power consumption required at a load per unit time, and a margin refers to a value equal to or smaller than 1 and is configured to put a margin at the target amount of selling power by having the calculated target amount of selling power be lower than a possible amount of selling power.

8. The power consumption control method of claim 7, wherein the power conversion unit is controlled to perform the discharging mode, in which one of the discharging of power or a reselling of power is performed, when the discharging cost is lower than the charging cost, and
the power conversion unit is controlled to perform the charging mode, in which the power storage unit is charged with at least one of a new renewable power and a grid power, when the charging cost is equal to or lower than the discharging cost.

9. A power consumption control apparatus, comprising:
a power storage unit at which a charging of power and a discharging of power are performed;
a power conversion unit configured to perform the charging of power and the discharging of power of the power storage unit; and
a control unit configured to calculate a target amount of selling power, calculate a target amount of selling power and a target amount of charging power, calculate a charging cost of power when charging power and a discharging cost of power when discharging power of the power storage unit, compare the calculated discharging cost with the calculated charging cost of the power storage unit, control the power conversion unit to perform a discharging mode of performing one of the discharging of power and a reselling of power when the discharging cost is lower than the charging cost, and control the power conversion unit to perform a charging mode to charge the power storage unit with at least one of a new renewable power and a grid power when the charging cost is equal to or lower than the discharging cost, thereby reducing a cost of power of the power consumption control apparatus, wherein the charging cost refers to a cost of power required for charging the power storage unit, and wherein the discharging cost includes a cost of power discharged and the price of power resold, wherein the target amount of selling power is expressed in a following mathematical formula:

$$Pw_t(SOC_t - |ePV_t - eLoad_t|) \times margin, \text{ and}$$

wherein the $SOC_t$ refers to a state of charge of a battery, the $ePV_t$ refers to an expected amount of power generation per unit time, the $eLoad_t$ refers to an expected amount of power consumption required at a load per unit time, and the margin refers to a value equal to or smaller than 1 and is configured to put a margin at the target amount of selling power by having the calculated target amount of selling power be lower than a possible amount of selling power.

10. The power consumption control apparatus of claim 9, wherein the control unit comprises:

a communication unit configured to provide and collect information in communication with at least one of the power conversion unit, the power storage unit, a load, a new renewable energy source configured to generate the new renewable power, and a power utility company configured to generate the grid power;

a storage unit configured to store the collected information;

an operation unit configured to operate according to the collected information; and a command generating unit configured to generate a control command for controlling power consumption, based on an operation of the operation unit.

11. The power consumption control apparatus of claim 9, wherein the power consumption control apparatus is provided at a power consumption subject, such that a supply or demand of the power, and a consumption of the power, are controlled at the power consumption subject.

12. A power consumption control apparatus comprising:

a power storage unit at which a charging of power and a discharging of power are performed;

a power conversion unit configured to perform the charging of the power and the discharging of the power of the power storage unit; and a control unit configured to calculate a target amount of selling power, calculate a charging cost of power when performing the charging of the power of the power storage unit and a discharging cost of power when discharging power of the power storage unit, compare the calculated discharging cost with the calculated charging cost, control the power conversion unit to perform a discharging mode when the calculated discharging cost is lower than the calculated charging cost, and control the power conversion unit to perform a charging mode when the calculated charging cost is equal to or lower than the calculated discharging cost, thereby reducing a cost of power of the power consumption control apparatus, wherein the charging cost refers to a cost of power required for charging the power storage unit, wherein the discharging cost includes the cost of power discharged and the price of power resold, wherein the target amount of selling power is expressed in a following mathematical formula:

$$Pw_t(SOC_t - |ePV_t - eLoad_t|) \times margin, \text{ and}$$

wherein the $SOC_t$ refers to a state of charge of a battery, the $ePV_t$ refers to an expected amount of power generation per unit time, the $eLoad_t$ refers to an expected amount of power consumption required at a load per unit time, and the margin refers to a value equal to or smaller than 1 and is configured to put a margin at the target amount of selling power by having the calculated target amount of selling power be lower than a possible amount of selling power.

13. The power consumption control apparatus of claim 12, wherein the control unit comprises:

a communication unit configured to provide and collect information in communication with at least one of the power conversion unit, the power storage unit, a load, a new renewable energy source configured to generate a new renewable power, and a power utility company configured to generate a grid power;

a storage unit configured to store the collected information;

an operation unit configured to operate according to the collected information; and a command generating unit configured to generate a control command for controlling a power consumption, based on an operation of the operation unit.

14. The power consumption control apparatus of claim 12, wherein the power consumption control apparatus is provided at a power consumption subject, such that a supply or demand of the power, and a consumption of the power are controlled at the power consumption subject.

15. A method for controlling power consumption, the method comprising:

calculating a target amount of selling power;

calculating a charging cost of charging power and a discharging cost of discharging power;

comparing the calculated charging cost with the calculated discharging cost; and determining whether to perform one of a charging mode and a discharging mode with respect to a power storage unit, based on the comparing, wherein the charging cost refers to a cost of power required for charging the power storage unit, and wherein a discharging cost includes a cost of power discharged and the price of power resold, wherein the target amount of selling power is expressed in a following mathematical formula:

$$Pw_t(SOC_t - |ePV_t - eLoad_t|) \times margin, \text{ and}$$

wherein the $SOC_t$ refers to a state of charge of a battery, the $ePV_t$ refers to an expected amount of power generation per unit time, the $eLoad_t$ refers to an expected amount of power consumption required at a load per unit time, and the margin refers to a value equal to or smaller than 1 and is configured to put a margin at the target amount of selling power by having the calculated target amount of selling power be lower than a possible amount of selling power.

16. The method of claim 15, wherein the charging mode is performed with respect to the power storage unit when the calculated charging cost is equal to or lower than the calculated discharging cost.

17. The method of claim 15, wherein the discharging mode is performed with respect to the power storage unit when the calculated discharging cost is lower than the calculated charging cost.

18. The method of claim 17, wherein the discharging mode includes one of performing discharging of the power stored in the power storage unit and reselling of at least a portion of the power stored in the power storage unit.

19. The method claim 18, wherein a determination of whether to perform the discharging of the power or the reselling of the power is based upon at least whether or not resale of power is possible at a current point of time.

* * * * *